Sept. 6, 1932.  M. T. VANDERVOORT  1,875,529
DEVICE FOR HOLDING AND OPERATING ROTARY TOOLS
Filed June 15, 1931  2 Sheets-Sheet 1
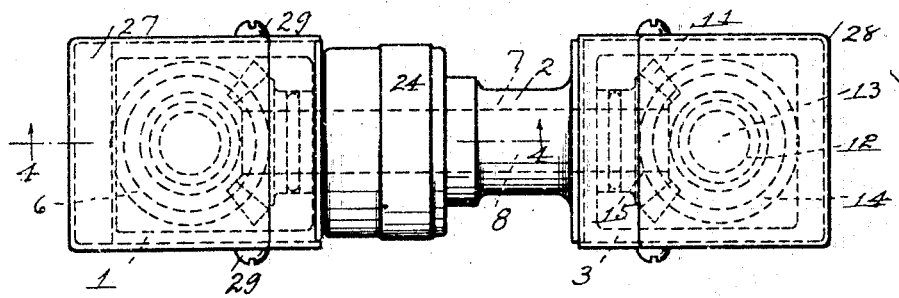
Fig. 2.
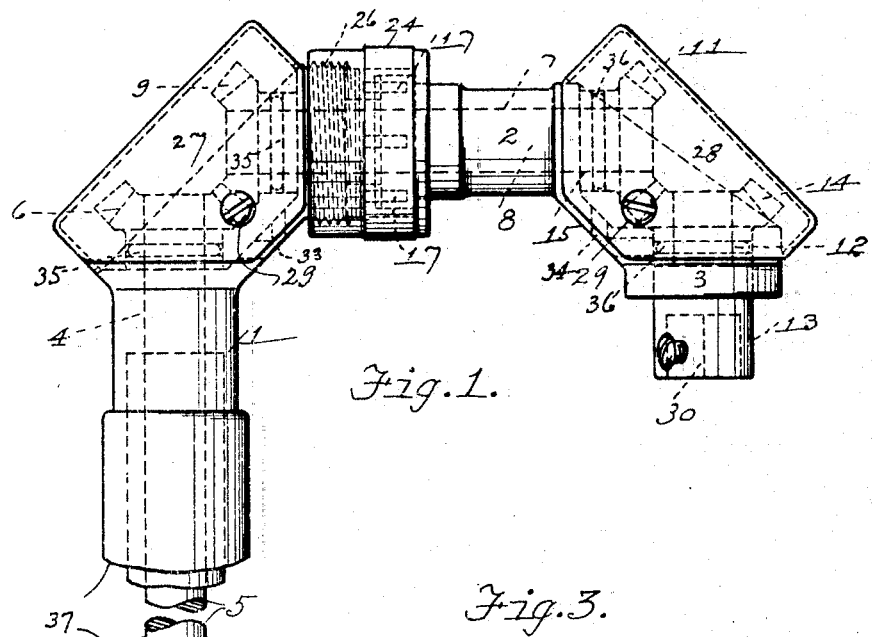
Fig. 1.
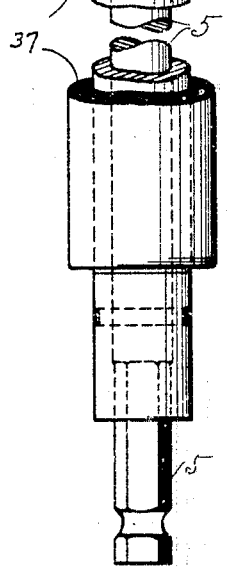
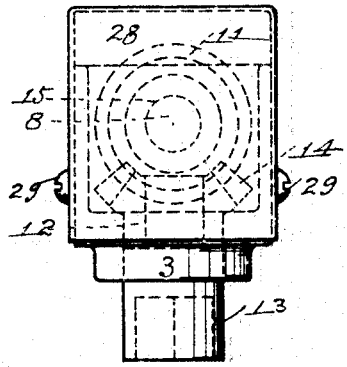
Fig. 3.
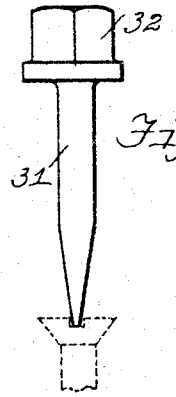
Fig. 11.
Fig. 12.
Witness:
Geo. L. Chapel
Inventor
Milford T. Vandervoort
By Rice and Rice
Attorneys Sept. 6, 1932.  M. T. VANDERVOORT  1,875,529
DEVICE FOR HOLDING AND OPERATING ROTARY TOOLS
Filed June 15, 1931  2 Sheets-Sheet 2
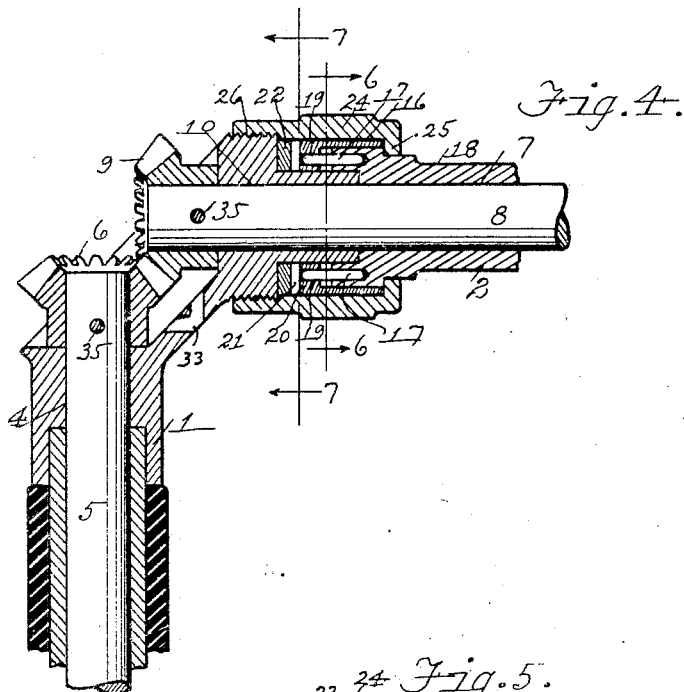
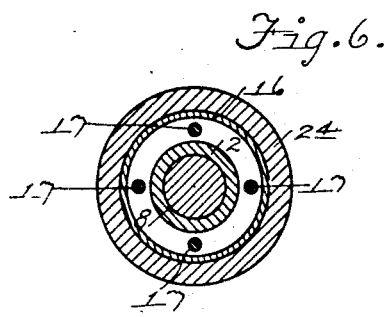
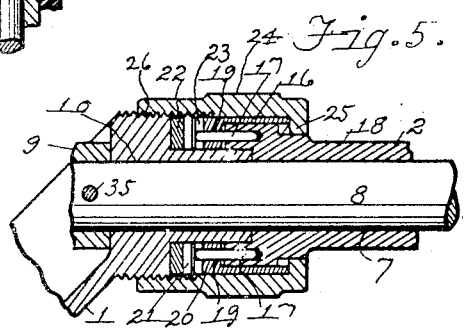
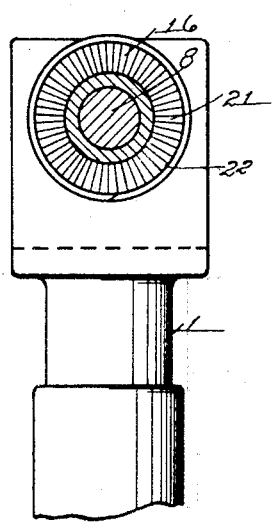
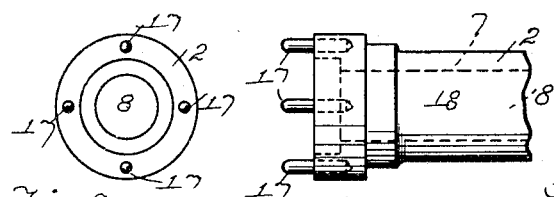
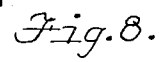
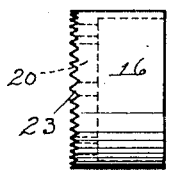
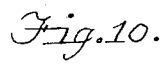
Inventor
Milford T. Vandervoort
By Rice and Rice
Attorneys
Witness:

Patented Sept. 6, 1932

1,875,529

UNITED STATES PATENT OFFICE

MILFORD T. VANDERVOORT, OF GRAND RAPIDS, MICHIGAN, ASSIGNOR TO AMERICAN SEATING COMPANY, OF GRAND RAPIDS, MICHIGAN, A CORPORATION OF NEW JERSEY

DEVICE FOR HOLDING AND OPERATING ROTARY TOOLS

Application filed June 15, 1931. Serial No. 544,494.

The present invention relates to tool-holding and operating devices; and its object is, generally, to provide an improved device of that character for a rotary tool; and more particularly, to provide such a device applicable to work in difficult positions; and further, to provide such a device which shall be sturdy in construction and very efficient in operation.

These and any other and more specific objects hereinafter appearing are attained by, and the invention finds preferable embodiment in, the structure and mechanism described in the body of this specification and illustrated by the accompanying drawings in which:—

Figure 1 is a side view of a rotary toolholding and operating device;

Figure 2 is an end view thereof;

Figure 3 is a side view of a portion of the same, looking toward the right-hand side of Figures 1 and 2;

Figure 4 is an axial sectional view of portions of the same taken on line 4—4 of Figure 1, the casing part being removed;

Figure 5 is a sectional view of portions of the same taken on said line but showing certain parts in another position;

Figure 6 is a transverse sectional view of the same taken on line 6—6 of Figure 4;

Figure 7 is a transverse sectional view of the same taken on line 7—7 of Figure 4, the collar 24 of the device being omitted;

Figure 8 is a side view of the bearing member for one of the shafts of the device;

Figure 9 is an end view thereof;

Figure 10 is a side view of a sleeve part of said bearing member;

Figure 11 is an end view of the tool-receiving member of the device; and

Figure 12 is a side view of a rotary tool adapted for use with the device.

In these drawings is illustrated a device for holding and rotating a tool, such as a screw driver, a drill, a wrench or the like. This device comprises arms or bearing members, 1, 2, 3, having bearings containing rotatable shafts, these bearings of adjacent bearing members being angularly disposed axially as shown, and the shafts therein having intermeshing gears. Thus, the handle of the device—the bearing member 1—has the bearing 4 in which rotates the driving shaft 5 having the bevel gear 6; the intermediate bearing member 2 has the bearing 7 in which rotates the shaft 8 whose bevel gear 9 meshes with the gear 6, this shaft also having a bearing 10 in the member 1 and at its other end the bevel gear 11; and the bearing member 3 has the bearing 12 in which rotates the shaft or tool-receiving member 13 having the bevel gear 14 meshing with the gear 11 on shaft 8 which also has a bearing 15 in the member 3.

The intermediate bearing member 2 is turnable about the axis of its bearing 7 relatively to one or the other of the pair of bearing members 1, 3, being (as shown) thus turnable relatively to the handle bearing member 1. When this intermediate member is thus turned to desired position, it is releasably held therein by suitable means, such means desirably comprising: a sleeve part 16 of the intermediate member 2 in splined relation therewith as by means of the pins 17 projecting from the end portion of the body 18 of this intermediate member and slidable in holes 19 in the inwardly extending annular flange 20 of said sleeve part; teeth 21 on the stationary ring 22 of the bearing member 1 circularly disposed about the bearing 10 thereof; circularly disposed teeth 23 on said sleeve part 16 adapted to be brought into engagement with the teeth 21; and a turnable collar 24 on the intermediate member 2 having an inwardly extending annular flange 25 engaging the edge of the sleeve part, and being internally threaded at 26 on the bearing member 1, so that when this collar is screwed down on said member 1 the teeth 23 engage the teeth 21 and hold the intermediate bearing member 2 in the position to which it has been turned.

The meshing gears 6, 9 and 11, 14 are covered by casing parts 27, 28 respectively, removably secured by screws 29. The shaft or tool-receiving member 13 has suitable means as the socket 30 in its end, for mounting the desired rotary tool, such for instance as the screw driver 31, the end 32 of which is received into said socket.

Openings 33, 34 are made in the bearing members 1, 3 into which a rod or punch may be inserted for driving out the key pins 35, 36 whereby the bevel gears are held on their shafts. The bearing member 1 desirably has a diametrically enlarged surrounding handle portion 37 as shown in Figure 1.

It will be seen that this device is adapted for use on work in positions difficult or impossible for the operator to reach with the usual devices of this character. In the adjustment of the device shown in Figure 1 a hole may be drilled into that side of a wall which is opposite that at which the operator stands; and the member 2 may be turned to various other adjustments for the drilling of holes, driving of screws, etc. in positions which the operator cannot reach with usual devices.

The invention being intended to be pointed out in the claims, is not to be limited to or by details of construction of the particular embodiment thereof illustrated by the drawings or hereinbefore described:

I claim:

1. In a device of the character described: bearing members having respectively rotary bearings angularly disposed axially; a driving shaft and a driven shaft rotatable in said bearings and having meshing gears; a tool-carrying member rotatable on the bearing member which contains the driven shaft, the bearing members being connected turnably about the axis of the driven shaft; means for releasably holding the bearing members against interrelative turning movement comprising teeth on one of the bearing members circularly disposed about its axis, a sleeve part of the other bearing member having circularly disposed teeth adapted to engage the first-mentioned teeth, and a collar on one of the bearing members engaging said sleeve part and threaded on the other bearing member, and turnable around said members to move said sleeve part and cause its teeth to engage the first-mentioned teeth.

2. In a device of the character described: bearing members having respectively rotary bearings angularly disposed axially; a driving shaft and a driven shaft rotatable in said bearings and having meshing gears; a tool-carrying member rotatable on the bearing member which contains the driven shaft, the bearing members being connected turnably about the axis of the driven shaft; means for releasably holding the bearing members against interrelative turning movement comprising teeth on one of the bearing members circularly disposed about its axis, a sleeve part of the other bearing member non-turnable thereon and having circularly disposed teeth adapted to engage the first-mentioned teeth, and a collar on one of the bearing members engaging said sleeve part and threaded on the other bearing member, and turnable around said members to move said sleeve part and cause its teeth to engage the first-mentioned teeth.

In testimony whereof I have hereunto set my hand at Grand Rapids, Michigan this 11th day of June, 1931.

MILFORD T. VANDERVOORT.